(12) United States Patent  (10) Patent No.: US 7,392,594 B2
Kesler  (45) Date of Patent: Jul. 1, 2008

(54) ELECTRICAL DEVICE-MOUNTING TOOL

(76) Inventor: Fred Kesler, 4290 Diana Way, Salt Lake City, UT (US) 84124

( * ) Notice: Subject to any disclaimer, the term of this patent is extended or adjusted under 35 U.S.C. 154(b) by 62 days.

(21) Appl. No.: 11/460,918

(22) Filed: Jul. 28, 2006

(65) Prior Publication Data

US 2008/0022543 A1    Jan. 31, 2008

(51) Int. Cl.
*G01D 21/00*    (2006.01)
(52) U.S. Cl. .................................. 33/528; 33/DIG. 10
(58) Field of Classification Search .................. 33/645, 33/613, 528, DIG. 10
See application file for complete search history.

(56) References Cited

U.S. PATENT DOCUMENTS

| | | | | | |
|---|---|---|---|---|---|
| 3,279,080 | A | * | 10/1966 | Stepshinski | 33/354 |
| 5,813,130 | A | * | 9/1998 | MacDowell | 33/528 |
| 6,810,598 | B2 | * | 11/2004 | Boys | 33/528 |
| 6,818,824 | B1 | * | 11/2004 | Marcou et al. | 33/528 |
| 6,865,819 | B2 | * | 3/2005 | Melittas | 33/528 |
| 7,134,217 | B2 | * | 11/2006 | Melittas | 33/528 |

* cited by examiner

*Primary Examiner*—Yaritza Guadalupe-McCall
(74) *Attorney, Agent, or Firm*—Kirton & McConkie; Michael F. Krieger

(57) ABSTRACT

A tool that can properly align, level, and true up light switches and outlets is described. More particularly, the tool can properly align and true up single or ganged light switches and ganged duplex outlets at installation.

20 Claims, 3 Drawing Sheets

ELECTRICAL DEVICE-MOUNTING TOOL

BACKGROUND OF THE INVENTION

1. Field of the Invention

The present invention relates to properly aligning and truing electrical devices. More particularly, the present invention relates to properly aligning and truing singly or ganged light switches and ganged duplex outlets at installation.

2. Background and Related Art

Since the introduction of standardized wiring boxes and wiring devices, electricians have been dependent on "eyeball truing", trial-and-error alignment, and tools not designed for the purpose (generally torpedo levels) to get aesthetically correct installations of such devices. Eyeballing is a problem because at the end of almost every job, an architect comes around and does a substantial completion inspection. Even though a light switch or duplex outlet that is two or three degrees out of plumb usually works properly, no architect will accept one that is installed out of plumb. Electricians are frequently required to return to substantially completed projects to correct such minor deviations. Money and time are routinely lost to these types of problems.

Alignment by trial and error is a problem because as people and companies demand more and more of their electrical systems, ganged outlets, and, to an even greater extent, ganged switches are becoming more and more commonplace. The trend is clearly apparent that outlets and switches are being ganged in even larger groups. It is not at all uncommon in modern houses for switches to be ganged together in threes and fours. In commercial applications, it is not uncommon for switches ganged together in groups of five and occasionally even eight. Aligning ganged wiring devices so that cover plates, which require very precise alignment, always fit the first time without removing the cover places to adjust the wiring devices is very difficult. Currently, no specialized tool exists to aid in this process. It typically takes an electrician two or three attempts to achieve proper alignment for the cover plates on multiple wiring devices, wasting much time and effort.

SUMMARY OF THE INVENTION

The present invention relates to properly aligning and truing light switches and outlets. More particularly, the present invention relates to properly aligning and truing singly or ganged light switches and ganged duplex outlets at installation.

Implementation of the present invention takes place in association with certain standardized features of the wiring devices because such devices are manufactured with a fixed standard relative to one another and to the cover plates.

In one embodiment, the present invention comprises a tool that is designed specifically for aligning and truing singly or ganged light switches and ganged duplex or GFI outlets at installation. When using the present invention, cover plates, which require very precise alignment, almost always fit the first time without removing the cover plates to adjust the wiring devices.

In another embodiment, prongs are used to engage the openings in the outlets where the cord prongs are plugged in, or to engage the screw holes in the frame of the switches where the cover plates attached.

In another embodiment, the tool is derived from gangable covers.

In another embodiment, the tool is split vertically down the middle and pivots on a center point around a pin.

In another embodiment, the tool ensures the electrical device fits snug and flush against the wall and proper grounding is achieved. The tool holds one or more electrical devices in proper alignment and level while the devices are secured in the box and against the wall. Thus, one or more cover plates fit correctly and are level, all devices in the box are properly fastened and, in the case of wiring systems using steel boxes, are securely grounded. This tool also engages one or more of the standard features known by one skilled in the art.

While the methods and processes of the present invention have proven to be particularly useful in the area of light switches and outlets, those skilled in the art can appreciate that the methods and processes can be used in a variety of different applications and in a variety of different areas of manufacture to yield reliable leveling and alignment results for mounting electrical devices, such as those devices used for telephone outlets, network interface outlets, and other similar devices.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to properly aligning and truing electrical devices. More particularly, the present invention relates to properly aligning and truing singly or ganged light switches and ganged duplex outlets at installation.

In the disclosure and in the claims the term "truing" shall refer to "making something level, square, balanced or concentric."

Figure 1:
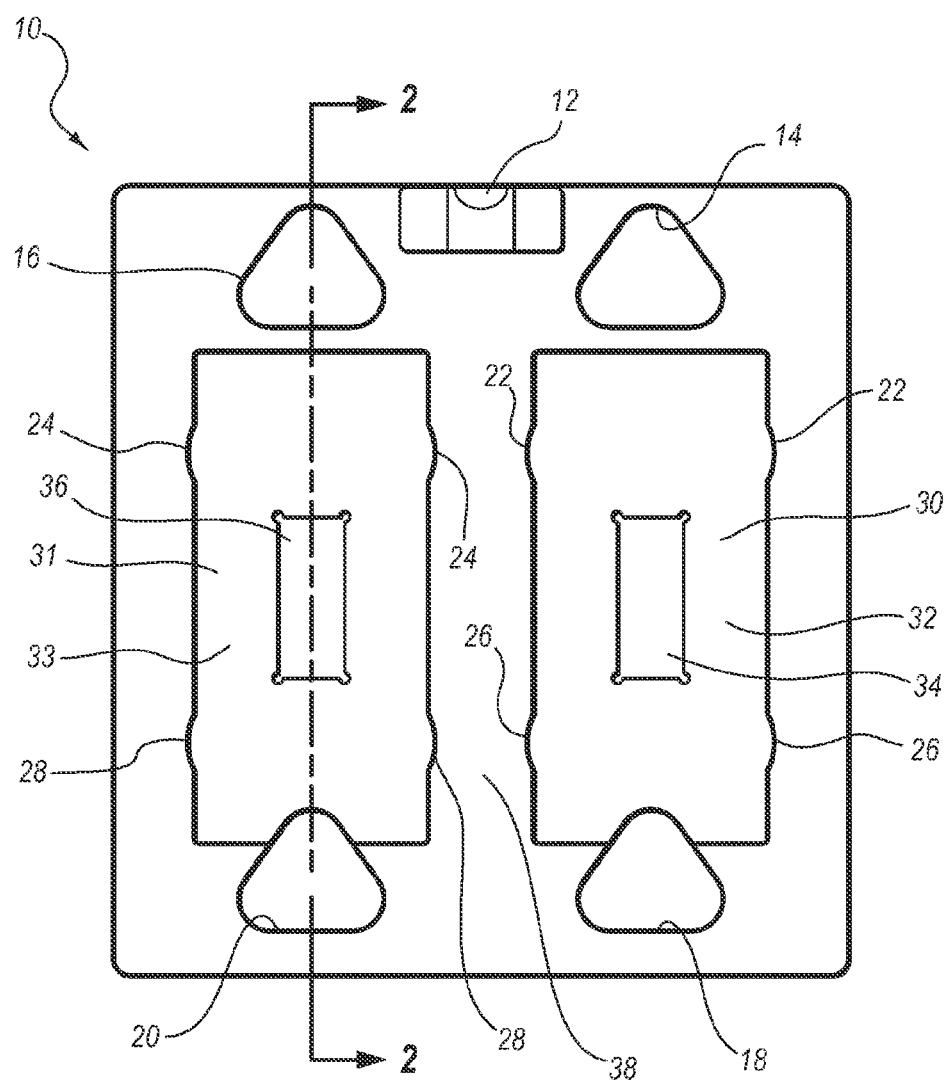
FIG. 1 illustrates a representative tool that properly aligns light switches and ganged duplex or GFI outlets at installation.

In FIG. 1, an illustrated embodiment of an electrical device-mounting tool 10 includes a level bubble 12, an upper right engagement opening 14, an upper left engagement opening 16, a lower right engagement opening 18, a lower left engagement opening 20, an upper right hollowed-out outlet notch 22, an upper left hollowed-out outlet notch 24, a lower right hollowed-out outlet notch 26, a lower left hollowed-out outlet notch 28, a right shallow standard wiring device indentation 30, a left shallow standard wiring device indentation 31, a right deep decora wiring device indentation 32, a left deep decora wiring device indentation 33, a right standard switch opening 34, a left standard switch opening 36 and a vertical divider 38. The right and left shallow standard wiring device indentations 30, 31 are located on one face 40 of the device-mounting tool 10, while the right and left deep decora wiring device indentations 32, 33 are located on the opposite face 42 of the device-mounting tool 10, as may be appreciated by reference to FIG. 2, which is a cross-sectional view of the device-mounting tool 10 taken along the line 2-2 shown in FIG. 1. As may also be appreciated from FIG. 2, the right and left standard switch openings 34, 36 and the four engagement openings 14, 16, 18, and 20 all pass completely through the device-mounting tool 10.

The upper right engagement opening 14, upper left engagement opening 16, lower right engagement opening 18 and lower left engagement opening 20 are sized such that both standard and decora wiring devices can be mounted using the electrical device-mounting tool 10 and allow for tightening the screws which attach the wiring devices to the boxes. While the engagement openings 14, 16, 18, and 20 are shown in approximately triangular shape, the exact shape of the engagement openings 14, 16, 18, and 20 is unimportant as long as the opening is sized to allow standard devices such as power screwdrivers and power drills with screwdriver bits to access the screws which attach the wiring devices to the boxes. As may be appreciated by reference to FIG. 1, the engagement openings 14, 16, 18, and 20 may even overlap or impinge upon other features of the device-mounting tool 10, such as the device indentations 30, 31, 32, and 33, so long as the engagement openings 14, 16, 18, and 20 do not prevent the secure alignment of the electrical devices, such as by completely overlapping or removing an entire edge of the device indentations 30, 31, 32, and 33. For example, FIG. 1 shows the lower engagement openings 18, 20 slightly overlapping the device indentations 30, 31, 32, and 33 along the bottom edges of the device indentations 30, 31, 32, and 33.

The level bubble 12 is seated into a space cut into the perimeter of the electrical device-mounting tool 10 to decrease the risk of the level bubble 12 being broken. The level bubble 12 may be attached to the device-mounting tool 10 in any method commonly known in the art, including using glue or epoxy resin. Depending on the manufacturing method used for the electrical device-mounting tool 10, the level bubble 12 may also be snap-fit into the space in the perimeter of the device-mounting tool 10. As may be appreciated by one of skill in the art, the location of the level bubble 12 may be varied for reasons of practicality or personal taste, and the level bubble 12 may also be rotated ninety degrees for use with vertically-ganged electrical devices.

The right standard switch opening 34 and left standard switch opening 36 are located within the right shallow standard wiring device indentation 30 and left shallow standard wiring device indentation 31, respectively. This allows the electrical device-mounting tool 10 to be used to mount standard switches as well as outlets.

The right shallow standard wiring device indentation 30 and left shallow standard wiring device indentation 31 are used with the upper right hollowed-out outlet notch 22, the upper left hollowed-out outlet notch 24, the lower right hollowed-out outlet notch 26, and the lower left hollowed-out outlet notch 28 to mount duplex and GFI outlets. The right deep decora wiring device indentation 32 and left deep decora wiring device indentation 33 are used to mount decora switches and are located on the opposite face 40 of the right shallow standard wiring device 30 and left shallow standard wiring device indentation 31, respectively. The vertical divider 38 is spaced at a standard distance to enable the mounting of ganged duplex outlets. In addition, the device indentations 30, 31, 32, 33, the hollowed-out outlet notches 22, 24, 26, and 28, and the standard switch openings 34 and 36 may be used in any combination to allow varied devices to be proximately located.

Figure 2:
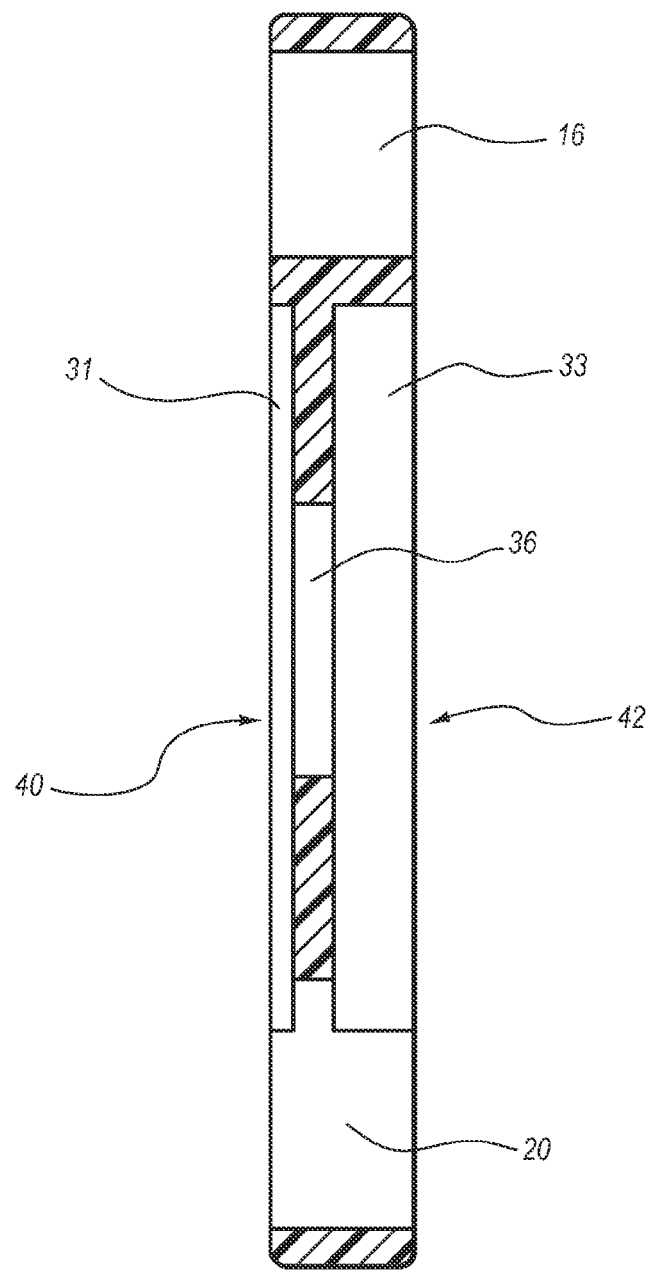
FIG. 2 illustrates a cross-sectional view of the tool from FIG. 1 taken along the line 2-2.

In the embodiment illustrated in FIGS. 1 and 2, the device-mounting tool 10 is manufactured from polycarbonate or some other hard plastic material. Polycarbonate has the advantage of being extremely durable and is also transparent to allow easy visibility of the electrical devices being mounted. The electrical device-mounting tool may be manufactured using a CNC lathe that precisely cuts all of the desired elements of the device-mounting tool 10 using computerized instructions. This ensures that the ganged electrical devices are very precisely aligned. Plastics and Polycarbonates are ideal materials for the device-mounting tool 10 since they are non-conductive. Although metals and other materials may also be used, it is not highly advisable to use electrically-conductive materials when mounting electrical devices, since live electrical wires may unexpectedly be encountered.

It may be readily appreciated how the device-mounting tool 10 may be used to properly align ganged electrical devices. The device-mounting tool 10 is placed over two devices so that the desired device indentation 31, 31, 32, or 33, hollowed-out outlet notches 22, 24, 26, or 28 or standard switch openings 34 or 36 engage the respective electrical devices to be aligned, ganged, or mounted. The user then aligns the device-mounting tool 10 and the engaged devices so as to align the devices with the receptacle box and screw mounting holes, and also so that the device-mounting tool 10 is level using the level bubble 12. Then, using a screwdriver, power drill with a screwdriver bit, or power screwdriver that passes through the engagement openings 14, 16, 18, and 20, the user secures the devices to the electrical box. The devices are then properly aligned and level and ready for the cover plate to be attached.

If more than two devices need to be aligned and ganged, the process proceeds as above, and then the device-mounting tool 10 is moved over so that one of the mounted devices engages one portion of the device-mounting tool 10 and the next device to be mounted engages another portion of the device-mounting tool 10. In this way any number of devices may be mounted properly and quickly in serial fashion. Of course, one of ordinary skill in the art may readily appreciate that the device-mounting tool 10 may be modified to include locations for more than two devices to further accelerate alignment and mounting. The present invention embraces embodiments with three, four, or even more device locations.

Figure 3:
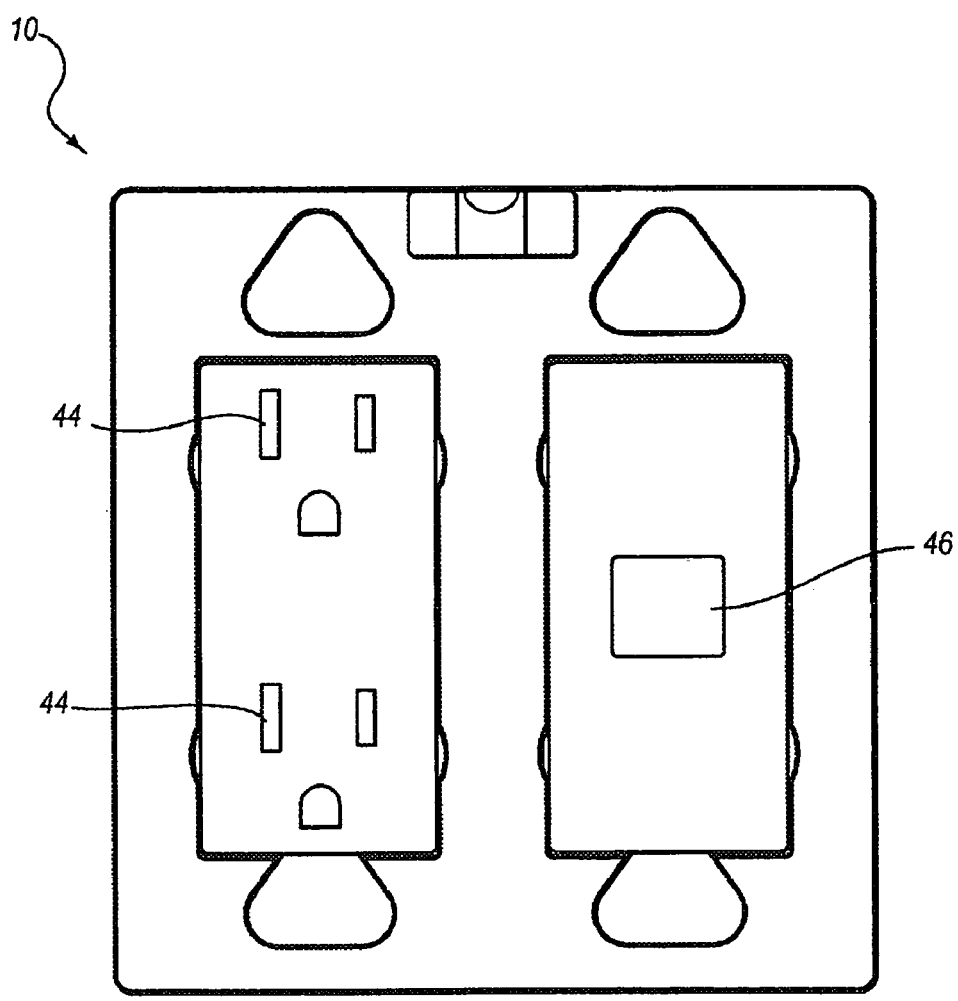
FIG. 3 illustrates an alternate tool for aligning different electrical devices.

The present invention also embodies alternate embodiments for use with other electrical devices. For example, FIG. 3 shows an embodiment of the electrical device-mounting tool 10 that includes prongs 44 that engage an outlet to ensure proper alignment. The embodiment also includes a telephone opening 46 sized to accommodate and facilitate proper alignment of a ganged RJ-11 device or other similar device. As may be appreciated by those skilled in the art, other modifications may be used for other electrical devices. For example, properly placed and chosen openings may be provided for standard networking devices, dual telephone jack devices, or any other now-known or later invented electrical device for which alignment and ganging may be desired.

One of skill in the art may also appreciate that the present invention may be advantageously used with a single device to ensure proper leveling of the device. The method is the same as that described above, with the exception that the device-mounting tool 10 only engages the single electrical device and the primary concern is leveling using the bubble level 12.

Thus, as discussed herein, the embodiments of the present invention embrace a device for properly aligning and truing electrical devices wherein said device properly aligns singly or ganged light switches and ganged duplex outlets at installation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An electrical device-mounting tool comprising:
   a level bubble attached to the device-mounting tool;
   a shallow standard wiring device indentation containing an upper hollowed-out outlet notch, a lower hollowed-out outlet notch and a standard switch opening;
   a deep decora wiring device indentation, located on the opposite side of the shallow standard wiring device indentation and containing an upper hollowed-out outlet notch, a lower hollowed-out outlet notch and a standard switch opening, wherein the standard switch opening corresponds to the standard switch opening of the shallow standard wiring device;
   an upper right engagement opening located at the upper right portion of the device-mounting tool;
   a lower right engagement opening located at the lower right portion of the device-mounting tool;
   an upper left engagement opening located at the upper left portion of the device-mounting tool;
   a lower left engagement opening located at the lower left portion of the device-mounting tool; and
   a vertical divider located adjacent the shallow standard wiring device indentation and the deep decora wiring device indentation.

2. An electrical device-mounting tool as recited in claim 1, further comprising:
   a second shallow standard wiring device indentation containing an upper hollowed-out outlet notch, a lower hollowed-out outlet notch and a standard switch opening; and
   a second deep decora wiring device indentation, located on the opposite side of the second shallow standard wiring device indentation and containing an upper hollowed-out outlet notch, a lower hollowed-out outlet notch and a standard switch opening, wherein the standard switch opening corresponds to the standard switch opening of the second shallow standard wiring device.

3. An electrical device-mounting tool as recited in claim 1, wherein the level bubble is located outside the perimeter of the electrical device-mounting tool.

4. An electrical device-mounting tool as recited in claim 1, further comprising a center pin.

5. An electrical device-mounting tool as recited in claim 1, wherein the level bubble is located inside the perimeter of the electrical device-mounting tool.

6. An electrical device-mounting tool as recited in claim 1, wherein the device-mounting tool is manufactured of polycarbonate.

7. An electrical device-mounting tool as recited in claim 1, wherein the device-mounting tool is manufactured of plastic.

8. An electrical device-mounting tool comprising:
   a level bubble attached to the device-mounting tool;
   a right shallow standard wiring device indentation containing an upper right hollowed-out outlet notch, a lower right hollowed-out outlet notch and a right standard switch opening;
   a left shallow standard wiring device indentation containing an upper left hollowed-out outlet notch, a lower left hollowed-out outlet notch and a left standard switch opening;
   a right deep decora wiring device indentation, located on the opposite side of the right shallow standard wiring device indentation;
   a left deep decora wiring device indentation located on the opposite side of the left shallow standard wiring device indentation;
   an upper right engagement opening located above the right shallow standard wiring device indentation;
   a lower right engagement opening located below the right shallow standard wiring device indentation;
   an upper left engagement opening located above the left shallow standard wiring device indentation;
   a lower left engagement opening located below the left shallow standard wiring device indentation; and
   a vertical divider separating the right shallow standard wiring device indentation and the left shallow standard wiring device indentation.

9. An electrical device-mounting tool as recited in claim 8, wherein the level bubble is located outside the perimeter of the electrical device-mounting tool.

10. An electrical device-mounting tool as recited in claim 8, further comprising a center pin.

11. An electrical device-mounting tool as recited in claim 8, wherein the level bubble is located inside the perimeter of the electrical device-mounting tool.

12. An electrical device-mounting tool as recited in claim 8, wherein the device-mounting tool is manufactured of polycarbonate.

13. An electrical device-mounting tool as recited in claim 8, wherein the device-mounting tool is manufactured of plastic.

14. A method of aligning, leveling, and truing up ganged electrical devices comprising:
   providing an electrical device-mounting tool comprising:
      a level bubble attached to the device-mounting tool;
      a right shallow standard wiring device indentation containing an upper right hollowed-out outlet notch, a lower right hollowed-out outlet notch and a right standard switch opening;
      a left shallow standard wiring device indentation containing an upper left hollowed-out outlet notch, a lower left hollowed-out outlet notch and a left standard switch opening;
      a right deep decora wiring device indentation, located on the opposite side of the right shallow standard wiring device indentation;
      a left deep decora wiring device indentation located on the opposite side of the left shallow standard wiring device indentation;
      an upper right engagement opening located above the right shallow standard wiring device indentation;
      a lower right engagement opening located below the right shallow standard wiring device indentation;
      an upper left engagement opening located above the left shallow standard wiring device indentation;
      a lower left engagement opening located below the left shallow standard wiring device indentation; and a vertical divider separating the right shallow standard wiring device indentation and the left shallow standard wiring device indentation;

engaging a pair of electrical devices in the device-mounting tool;

leveling the device-mounting tool wherein screw holes on the electrical devices align with screw holes on an electrical box; and mounting the pair of electrical devices to the electrical box by screwing the devices to the box through the engagement openings of the device-mounting tool.

15. The method of claim 14, further comprising:

engaging another pair of electrical devices in the device-mounting tool wherein one of the pair of electrical devices is a mounted electrical device and one of the pair of electrical devices is a non-mounted electrical device; and mounting the non-mounted electrical device to the electrical box by screwing the devices to the box through the engagement openings of the device-mounting tool.

16. The method of claim 15, further comprising repeating the steps of:

engaging another pair of electrical devices in the device-mounting tool wherein one of the pair of electrical devices is a mounted electrical device and one of the pair of electrical devices is a non-mounted electrical device; and mounting the non-mounted electrical device to the electrical box by screwing the devices to the box through the engagement openings of the device-mounting tool.

17. The method of claim 14 wherein the pair of electrical devices comprises decora electrical devices.

18. The method of claim 14 wherein the pair of electrical devices comprises a pair of standard light switches.

19. The method of claim 14 wherein the pair of electrical devices comprises a pair of standard electrical outlets.

20. The method of claim 14 wherein the pair of electrical devices comprises a mixed pair of electrical devices selected from the group of standard light switches, standard electrical outlets and decora electrical devices.

* * * * *